United States Patent

Koganezawa

(10) Patent No.: US 7,085,092 B2
(45) Date of Patent: Aug. 1, 2006

(54) HEAD SLIDER RECEIVING VARIABLE URGING FORCE IN RECORDING MEDIUM DRIVE

(75) Inventor: Shinji Koganezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 10/372,581

(22) Filed: Feb. 21, 2003

(65) Prior Publication Data

US 2004/0032686 A1    Feb. 19, 2004

(30) Foreign Application Priority Data

Aug. 13, 2002    (JP)    ............... 2002-235564

(51) Int. Cl.
*G11B 21/02*    (2006.01)
(52) U.S. Cl. ..................... 360/75; 360/78.01
(58) Field of Classification Search .................. 360/75, 360/25, 294, 294.1, 294.2, 294.7, 294.4, 360/77.16
See application file for complete search history.

(56) References Cited

U.S. PATENT DOCUMENTS

| | | | |
|---|---|---|---|
| 5,237,472 A | 8/1993 | Morehouse et al. | ........ 360/105 |
| 5,574,604 A | 11/1996 | Berg et al. | ................. 360/105 |
| 5,719,720 A * | 2/1998 | Lee | ............................. 360/71 |
| 6,307,719 B1 * | 10/2001 | Mallary | ................... 360/294.7 |
| 6,437,948 B1 * | 8/2002 | Sugimoto | ............... 360/294.7 |
| 6,700,726 B1 * | 3/2004 | Gillis et al. | ................... 360/75 |
| 6,757,124 B1 * | 6/2004 | Kelemen | ..................... 360/75 |
| 6,760,174 B1 * | 7/2004 | Forehand | .................... 360/53 |

FOREIGN PATENT DOCUMENTS

| | | |
|---|---|---|
| JP | 63-273287 | 11/1988 |
| JP | 4-137282 | 5/1992 |
| JP | 05-225732 | 9/1993 |
| JP | 2001-307444 | 11/2001 |

* cited by examiner

*Primary Examiner*—David Hudspeth
*Assistant Examiner*—Jason Olson
(74) *Attorney, Agent, or Firm*—Greer, Burns & Crain, Ltd.

(57) ABSTRACT

The operation of the changing mechanism is set to enhance the intensity of the urging force if the acceleration sensor detects an impact. The head slider is urged against the surface of the recording medium with the urging force of a larger intensity. Accordingly, the head slider is allowed to keep contacting the recording medium irrespective of the impact. The head slider is thus prevented from jumping up from the surface of the recording medium. A collision is surely avoided between the head slider and the recording medium. In addition, the head slider is urged against the surface of the recording medium when the recording medium stands still. The head slider is completely prevented from dropping onto the recording medium.

19 Claims, 5 Drawing Sheets

HEAD SLIDER RECEIVING VARIABLE URGING FORCE IN RECORDING MEDIUM DRIVE

BACKGROUND OF THE INVENTION

1. Field of the Invention

The present invention relates to a recording medium drive such as a hard disk drive (HDD) including a head slider opposed to a magnetic recording disk, for example. In particular, the invention relates to a recording medium drive including an elastic urging member designed to urge the head slider toward the recording medium.

2. Description of the Prior Art

A load/unload mechanism is well known in the technical field of hard disk drives (HDDs) as disclosed in U.S. Pat. Nos. 5,237,472 and 5,574,604, for example. The load/unload mechanism is designed to support the tip end of an elastic urging member such as a head suspension and hold the head slider at a position spaced from the surface of the magnetic recording disk, when the magnetic recording disk stands still. The load/unload mechanism serves to avoid contact between the magnetic recording disk and the head slider when the magnetic recording disk stands still, so that the head slider is reliably prevented from adsorption to the magnetic recording disk. The magnetic recording disk is allowed to reliably start rotating irrespective of a reduction in the driving torque of a spindle motor.

When the magnetic recording disk starts rotating, the tip end of the head suspension is released from a ramp member of the load/unload mechanism. The head slider immediately receives the urging force of a predetermined intensity based on the resilience of the head suspension. The head slider is thus forced to drop toward the surface of the magnetic recording disk. If the head slider is excessively urged in dropping, the head slider is forced to collide against the surface of the magnetic recording disk. The collision may induce damages on the head slider and/or the magnetic recording disk.

SUMMARY OF THE INVENTION

It is accordingly an object of the present invention to provide a recording medium drive capable of effectively restraining a drop of a head slider so as to possibly avoid collision between the head slider and a recording medium.

According to a first aspect of the present invention, there is provided a recording medium drive comprising: an enclosure; a recording medium incorporated within the enclosure; a head slider incorporated within the enclosure; an elastic urging member designed to establish the urging force of a predetermined intensity on the head slider toward the recording medium when the head slider flies above the recording medium at a predetermined flying height; a changing mechanism designed to change the urging force of the elastic urging member; an impact sensor attached to the enclosure and designed to detect an impact; and a controller circuit designed to control the changing mechanism in response to an output of the impact sensor.

The intensity of the urging force of the elastic urging member can be controlled in view of the output from the acceleration sensor in the recording medium drive. For example, the operation of the changing mechanism may be set to enhance the intensity of the urging force if the acceleration sensor detects an impact. The head slider may be urged against the surface of the recording medium with the urging force of a larger intensity. Accordingly, the head slider is allowed to keep contacting the recording medium irrespective of the impact. The head slider is thus prevented from jumping up from the surface of the recording medium. A collision is surely avoided between the head slider and the recording medium.

The head slider is urged against the surface of the recording medium in the recording medium drive of the aforementioned type when the recording medium stands still. The head slider is completely prevented from dropping onto the recording medium. In addition, when the recording medium starts moving or rotating, the urging force of a relatively smaller intensity can be applied to the head slider. Adsorption or meniscus effect can be suppressed between the head slider and the recording medium.

According to a second aspect of the present invention, there is provided a recording medium drive comprising: an enclosure; a recording medium incorporated within the enclosure; a head slider incorporated within the enclosure; an elastic urging member designed to establish the urging force of a predetermined intensity on the head slider toward the recording medium when the head slider flies above the recording medium at a predetermined flying height; a changing mechanism designed to change the urging force of the elastic urging member; and a controller circuit designed to control the changing mechanism to increase the urging force of the elastic urging member when the recording medium stands still rather than during movement of the recording medium.

The urging force of the elastic urging member can be increased in the recording medium drive of the aforementioned type when the recording medium stands still, as compared with the situation where a relative movement is established between the head slider and the recording medium. The head slider is urged against the surface of the recording medium with the urging force of a larger intensity. Accordingly, the head slider is allowed to keep contacting the recording medium even when an impact acts on the recording medium drive. The head slider is thus prevented from jumping up from the surface of the recording medium. A collision is surely avoided between the head slider and the recording medium.

The head slider is urged against the surface of the recording medium in the recording medium drive of the aforementioned type when the recording medium stands still. The head slider is completely prevented from dropping onto the recording medium. In addition, when the recording medium starts moving or rotating, the urging force of a relatively smaller intensity can be applied to the head slider. Adsorption or meniscus effect can be suppressed between the head slider and the recording medium.

According to a third aspect of the present invention, there is provided a recording medium drive comprising: an enclosure; a recording medium incorporated within the enclosure; a head slider incorporated within the enclosure; an elastic urging member designed to establish the urging force of a predetermined intensity on the head slider toward the recording medium when the head slider flies above the recording medium at a predetermined flying height; a changing mechanism designed to change the urging force of the elastic urging member; a ramp member designed to receive the urging force of the elastic urging member, when the recording medium stands still, so as to hold the head slider at an inoperative position spaced from the recording medium; and a controller circuit designed to control the changing mechanism to decrease the urging force of the elastic urging member when the head slider is released from the ramp member.

The recording medium drive of this type allows the head slider to be held at a position spaced from the recording medium when the recording medium stands still. A collision is surely prevented between the head slider and the recording medium. Adsorption or meniscus effect can completely be avoided between the head slider and the recording medium. Moreover, the urging force of the elastic urging member can be reduced when the head slider is released from the ramp member. The head slider drops from the ramp member with the urging force of a reduced intensity. Accordingly, a collision is surely avoided between the head slider and the recording medium. On the other hand, if the head slider drops with the urging force of an enough intensity, the head slider tends to collide against the surface of the recording medium. The collision is supposed to cause damages on the head slider and/or the recording medium.

The controller circuit may be designed to control the changing mechanism to decrease the urging force of the elastic urging member when the head slider is held at the inoperative position. In this case, the urging force of the elastic urging member can be minimized when the head slider is held on the ramp member. Only a minimum resilience is stored in the elastic urging member. Accordingly, the load to the elastic urging member can be suppressed to the utmost when the recording medium stands still.

According to a fourth aspect of the present invention, there is provided a recording medium drive comprising: an enclosure; a recording medium incorporated within the enclosure; a head slider incorporated within the enclosure; a head element mounted on the head slider and opposed to the recording medium; an elastic urging member designed to establish the urging force of a predetermined intensity on the head slider toward the recording medium when the head slider flies above the recording medium at a predetermined flying height; a changing mechanism designed to change the urging force of the elastic urging member; and a controller circuit designed to generate a control signal for the changing mechanism based on a read signal output from the head element.

The controller circuit can be set to generate the control signal for increasing the urging force of the elastic urging member in case where the output of the head element cannot reach a predetermined threshold level or intensity. The control signal is supplied to the changing mechanism. A reduced flying height of the head slider based on the increased urging force serves to enhance the level or intensity of the read signal. On the other hand, the controller circuit can likewise be set to generate the control signal for reducing the urging force of the elastic urging member in case where the output of the head element exceeds a predetermined threshold level or intensity. The control signal is supplied to the changing mechanism. An increased flying height of the head slider based on the reduced urging force serves to reduce the level or intensity of the read signal. According to the adjustment of the level or intensity in the read signal based on the intensity of the urging force in a manner as described above, a static dispersion of a predetermined range may be permitted in the flying height of the head slider. Requirement to the accuracy can be relieved in assembling the head slider into the recording medium drive. The yield of the recording medium drive can be improved. In this case, a signal pattern, specific to measurement of the flying height of the head slider, may be established in a servo pattern area over the recording medium. The head element may generate the output based on the signal pattern.

In any event, the changing mechanism may include a microactuator designed to take first and second attitudes. The microactuator of the first attitude causes the elastic urging member to deform by a first quantity so as to establish the urging force of a predetermined intensity based on a resilience. The microactuator of the second attitude causes the elastic urging member to deform by a second quantity larger than the first quantity so as to increase the urging force. The microactuator may include a piezoelectric element attached to the elastic urging member and designed to elongate and shrink depending on supply of an electric power. The piezoelectric element may be designed to take the second attitude when the piezoelectric element receives the electric power. Alternatively, the piezoelectric element may be designed to take the first attitude when the piezoelectric element receives the electric power.

Furthermore, according to a fifth aspect of the present invention, there is provided a method of controlling, comprising urging a head slider toward a recording medium in a recording medium drive when the recording medium stands still, with an urging force larger than that during movement of the recording medium.

The method allows the urging force of a larger intensity when the recording medium stands still, as compared with the situation where a relative movement is established between the head slider and the recording medium. The head slider is urged against the surface of the recording medium with the urging force of a larger intensity. Accordingly, the head slider is allowed to keep contacting the recording medium even when an impact acts on the recording medium drive. The head slider is thus prevented from jumping up from the surface of the recording medium. A collision is surely avoided between the head slider and the recording medium.

According to a sixth aspect of the present invention, there is provided a method of controlling, comprising: urging a head slider toward a recording medium in a recording medium drive with the urging force of a predetermined intensity; and increasing the urging force when an impact is detected based on the output from an impact sensor.

The method allows the urging force of an increased intensity if the acceleration sensor detects an impact, for example. The head slider may be urged against the surface of the recording medium with the urging force of a larger intensity. Accordingly, the head slider is allowed to keep contacting the recording medium irrespective of the impact. The head slider is thus prevented from jumping up from the surface of the recording medium. A collision is surely avoided between the head slider and the recording medium.

According to a seventh aspect of the present invention, there is provided a method of controlling, comprising: urging a head slider toward a recording medium in a recording medium drive with the urging force of a predetermined intensity when the recording medium stands still; and decreasing the urging force when the head slider moves relative to the recording medium.

The method allows the head slider to be urged against the surface of the recording medium with the urging force of a larger intensity when the recording medium stands still. The head slider is completely kept contacting the recording medium irrespective of an impact. The head slider is thus prevented from jumping up from the recording medium. A collision is surely prevented between the head slider and the recording medium. In addition, when the recording medium starts moving or rotating, the urging force of a relatively smaller intensity can be applied to the head slider. The recording medium is allowed to normally start moving or rotating.

According to an eighth aspect of the present invention, there is provided a method of controlling, comprising: applying the urging force of a predetermined intensity when a head slider flies above a recording medium by a predetermined flying height in a recording medium drive; and decreasing the urging force when the urging force is received by a ramp member of a load/unload mechanism.

The method allows the head slider to receive the urging force of a reduced intensity when the head slider is released from the ramp member. The head slider drops from the ramp member with the urging force of a reduced intensity. Accordingly, a collision is surely avoided between the head slider and the recording medium.

According to a ninth aspect of the present invention, there is provided a method of controlling, comprising: obtaining a read signal from a head element on ahead slider, said head element opposed to a recording medium in a recording medium drive; and adjusting the urging force applied to the head slider based on the intensity of the read signal.

The method allows the head slider to receive the urging force of a larger intensity in case where the output of the head element cannot reach a predetermined threshold level or intensity. A reduced flying height of the head slider based on the increased urging force serves to enhance the level or intensity of the read signal. On the other hand, the method allows the head slider to receive the urging force of a smaller intensity in case where the output of the head element exceeds a predetermined threshold level or intensity. An increased flying height of the head slider based on the reduced urging force serves to reduce the level or intensity of the read signal. According to the adjustment of the level or intensity in the read signal based on the intensity of the urging force in a manner as described above, a static dispersion of a predetermined range may be permitted in the flying height of the head slider. Requirement to the accuracy can be relieved in assembling the head slider into the recording medium drive. The yield of the recording medium drive can be improved. In this case, a signal pattern, specific to measurement of the flying height of the head slider, may be established in a servo pattern area over the recording medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
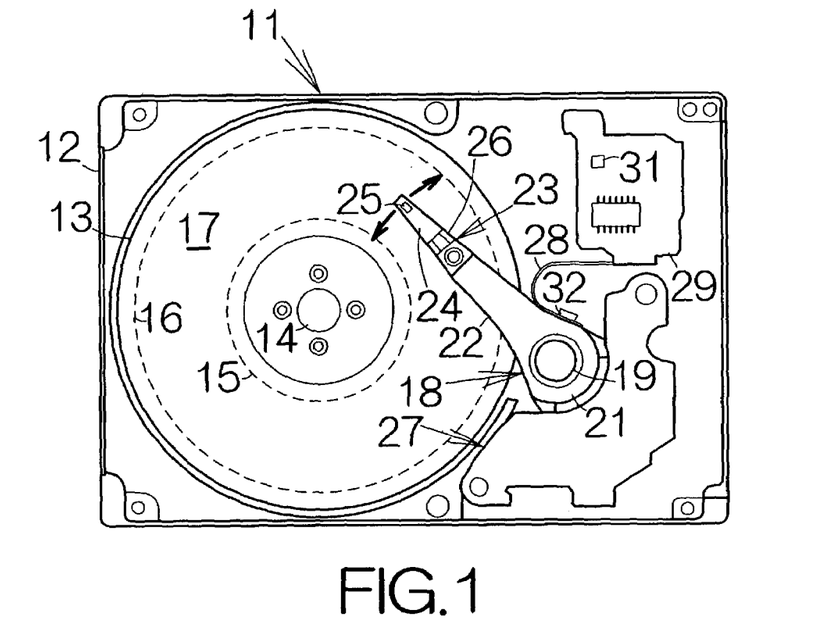
FIG. 1 is a plan view schematically illustrating the structure of a hard disk drive (HDD) as an example of a magnetic recording medium drive according to a first embodiment of the present invention.

FIG. 1 schematically illustrates the inner structure of a hard disk drive (HDD) 11 as an example of a magnetic recording medium drive or storage device according to a first embodiment of the present invention. The HDD 11 includes a box-shaped primary enclosure 12 defining an inner space of a flat parallelepiped, for example. At least one magnetic recording disk 13 is incorporated in the inner space within the primary enclosure 12. The magnetic recording disk 13 is mounted on the driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A data zone 17 is defined over the surface of the magnetic recording disk between an innermost recording track 15 and an outermost recording track 16. Concentric circular recording tracks are defined in the data zone 17. Marginal zones are established on the magnetic recording disk 13 inside the innermost recording track 15 and outside the outermost recording track 16. No data is recorded on the marginal zones.

A head actuator 18 is also incorporated within the inner space of the primary enclosure 12. The head actuator 18 includes an actuator block 21 supported on a vertical support shaft 19 for rotation. Rigid actuator arms 22 are defined in the actuator block 21. The actuator arms 22 are designed to extend in a horizontal direction from the vertical support shaft 19. The actuator arms 22 are associated with the front and back surfaces of the magnetic recording disk or disks 13, respectively. The actuator block 21 may be made of aluminum. Molding process may be employed to form the actuator block 22.

Head suspension assemblies 23 are attached to the front ends of the actuator arms 22. The individual head suspension assembly 23 includes an elastic urging member or elastic suspension 24 designed to extend forward from the corresponding tip end of the actuator arm 22. A flying head slider 25 is supported on the front end of the individual elastic suspension 24. A so-called magnetic head or electromagnetic transducer, not shown, is mounted on the flying head slider 25. The electromagnetic transducer may include a read element such as a giant magnetoresistive (GMR) element or a tunnel-junction magnetoresistive (TMR) element, and a write element such as a thin film magnetic head. The GMR or TMR element is designed to discriminate magnetic bit data on the magnetic recording disk 13 by utilizing variation in the electric resistance of a spin valve film or a tunnel-junction film. The thin film magnetic head is designed to write magnetic bit data into the magnetic recording disk 13 by utilizing a magnetic field induced at a thin film coil pattern. The read element and write element are opposed to the surface of the magnetic recording disk 13.

The elastic suspension 24 serves to establish an urging force on the flying head slider 25 toward the surface of the magnetic recording disk 13. When the magnetic recording disk stands still, the flying head slider 25 is forced to contact the surface of the magnetic recording disk 13 based on the urging force. On the other hand, when the magnetic recording disk 13 rotates, the flying head slider 25 is allowed to receive airflow generated along the rotating magnetic recording disk 13. The airflow serves to generate a lift on the flying head slider 25. The lift counteracts the urging force so as to cause flight of the flying head slider 25 above the surface of the magnetic recording disk 13. The flying head slider 25 is allowed to keep flying above the surface of the magnetic recording disk 13 during the rotation of the magnetic recording disk 13 at a higher stability established by the balance between the lift and the urging force of the elastic suspension 24.

A changing mechanism 26 is incorporated in the head suspension assembly 23. The changing mechanism 26 is designed to change the urging force of the elastic suspension 24. The quantity of deformation is changed in the elastic suspension 24 so as to change the urging force. The changing mechanism 26 will be described later in detail.

A driving power source 27 such as a voice coil motor (VCM) is connected to the actuator block 21. The driving power source 27 drives the actuator block 21 for rotation around the support shaft 19. The rotation of the actuator block 21 induces the swinging movement of the actuator arms 22 and the elastic suspensions 24. The swinging movement of the actuator arm 22 allows the flying head slider 25 to move across the data zone 17 between the innermost and outermost recording tracks 15, 16 during the rotation of the magnetic recording disk 13. This movement serves to position the flying head slider 25 right above a target recording track on the magnetic recording disk 13. On the other hand, the swinging movement of the actuator arm 22 allows the flying head slider 25 to reach a so-called contact zone inside the innermost recording track 15 when the magnetic recording disk 13 stands still.

A flexible printed circuit board 28 is also incorporated within the inner space of the primary enclosure 12. An end of the flexible printed circuit board 28 is received on the surface of the actuator block 21. The other end of the flexible printed circuit board 28 is connected to a controller board 29 likewise incorporated within the inner space of the primary enclosure 12. The controller board 29 is electrically connected to a printed circuit board, not shown, attached to the back surface of the primary enclosure 12, for example. The controller board 29 and a controller circuit established on the printed circuit board serve to manage the operation of the HDD 11. The controller circuit may be a microprocessor unit (MPU), a digital signal processing unit (DSP), or the like. An acceleration sensor 31 is mounted on the controller board 29. The acceleration sensor 31 corresponds to an impact sensor of the present invention.

A head IC chip 32 is mounted on the surface of the flexible printed circuit board 28. The head IC chip 32 is electrically connected to the read element as well as the write element on the flying head slider 25. A conductive wiring pattern, not shown, extending over the surface of the elastic suspension 24 is utilized to establish the electric connection between the head IC chip 32 and the read and write elements. A predetermined signal processing circuit is established on the head IC chip 32. The signal processing circuit generates read signals based on the variation in the voltage output from the read element and write signals supplied to the write element.

Figure 2:
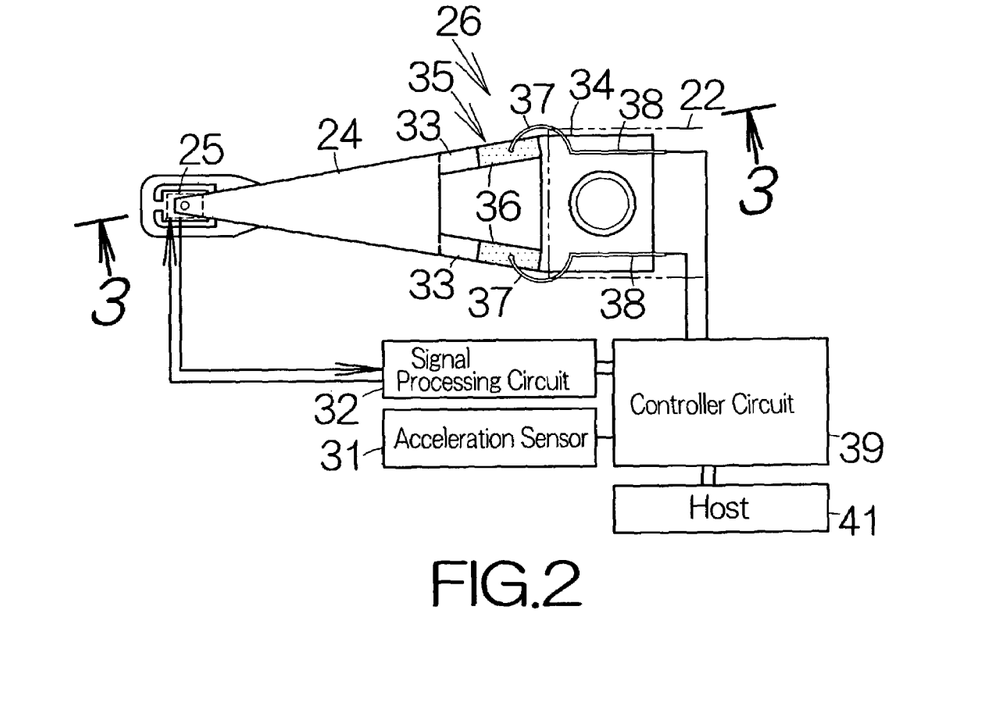
FIG. 2 is an enlarged plan view of a head suspension assembly.

As shown in FIG. 2, the changing mechanism 26 includes a microactuator 35 disposed between an elastic section 33 of the elastic suspension 24 and a fixation plate 34 fixed to the actuator arm 22. The microactuator 35 includes piezoelectric elements 36 attached to parts of an electrically-conductive plate material for providing the elastic section 33. The details of the piezoelectric elements 36 will be described later. The piezoelectric elements 36 may be adhered solely to the upper surface of the plate material, or independently to both the upper and lower surfaces of the plate material. The elastic suspension 24 is allowed to establish the aforementioned urging force based on the resilience of the elastic section 33.

Fine wires 37 by wire bonding technique are connected to the piezoelectric elements 36, for example. The other ends of the fine wires 37 are connected to printed wiring patterns 38 extending over the surface of the fixation plate 34. The printed wiring patterns 38 are then electrically connected to a controller circuit 39. The piezoelectric elements 36 thus receive control or voltage signals from the controller circuit 39. The piezoelectric elements 36 are allowed to elongate and shrink based on the voltage signals supplied from the controller circuit 39. The controller circuit 39 is designed to receive from a host 41, such as a main computer or CPU (central processing unit), electric signals specifying various instructions and data. In addition, the controller circuit 39 is designed to exchange electric signals with the signal processing circuit on the head IC chip 32 and the acceleration sensor 31 in the aforementioned manner.

Figure 3:
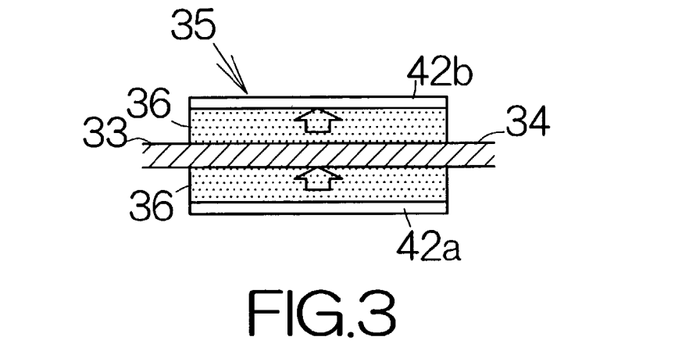
FIG. 3 is an enlarged vertical sectional view of a microactuator taken along the line 3—3 in FIG. 2.
Figure 4:
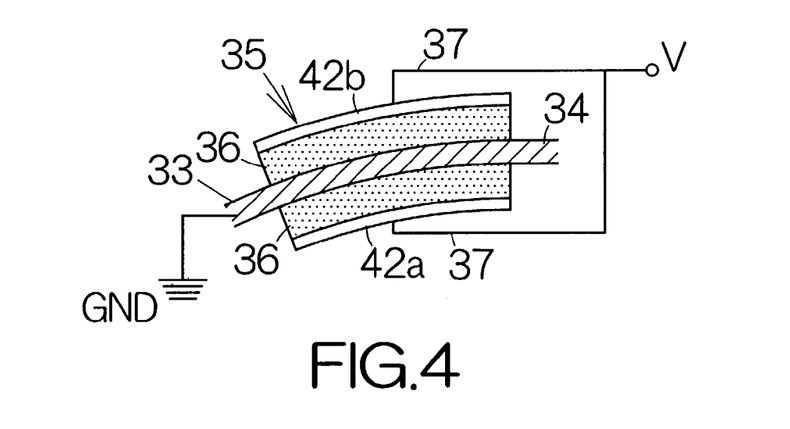
FIG. 4 is an enlarged vertical sectional view, corresponding to FIG. 3, of the microactuator taking a second attitude.

As shown in FIG. 3, the polarization is established in the microactuator 35 in the direction from an electrically-conductive or electrode plate 42a fixed to the surface of the piezoelectric element 36 on the back side to an electrically-conductive or electrode plate 42b fixed to the surface of the piezoelectric element 36 on the front side. Here, the piezoelectric element 36 on the back side is opposed to the surface of the magnetic recording disk 13. According to this polarization, when voltage is applied from the electrode plates 42a, 42b, as shown in FIG. 4, the piezoelectric element 36 on the front side elongates along the surface of the plate material while the piezoelectric element 36 on the back side shrinks along the surface of the plate material. The original shapes of the piezoelectric elements 36, 36, without application of the voltage, are designed to establish a predetermined first attitude of the microactuator 35. On the other hand, when the voltage is applied to the piezoelectric elements 36, 36, the microactuator 35 takes a predetermined second attitude. When the second attitude is established in the microactuator 35, the elastic section 33 of the elastic suspension 24 approaches the magnetic recording disk 13.

Figure 5:
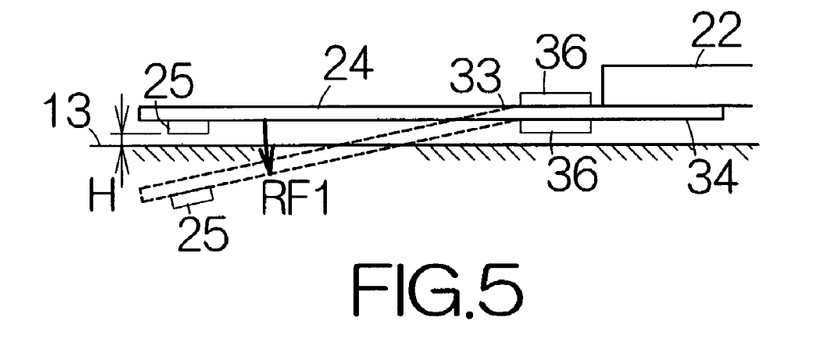
FIG. 5 is a schematic view illustrating the status of the head suspension assembly during the rotation of a magnetic recording disk.

As shown in FIG. 5, the microactuator 35 is maintained in the first attitude during the rotation of the magnetic recording disk 13. Specifically, no voltage signals are supplied to the piezoelectric elements 36 from the controller circuit 39. The piezoelectric elements 36 are maintained in the original shapes. The flying head slider 25 flies above the surface of the magnetic recording disk 13 by a predetermined flying height H. The elastic section 33 of the elastic suspension 24 deforms by a relatively larger first quantity of deformation. A predetermined resilience RF1 is stored in the elastic section 33. The elastic section 33 generates the urging force based on the resilience RF1. The generated urging force of a predetermined intensity is balanced with the lift of the flying head slider 25.

Figure 6:
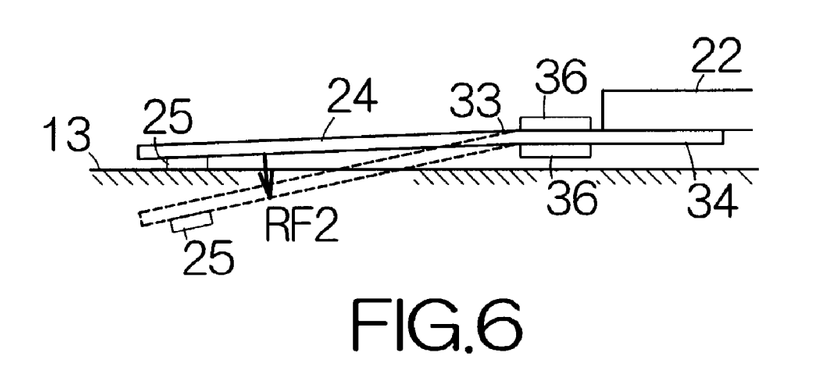
FIG. 6 is a schematic view illustrating the status of the head suspension assembly when the magnetic recording disk stands still.

When the magnetic recording disk 13 stands still, the actuator arm 22 is positioned at an inoperative position. The flying head slider 25 contacts the magnetic recording disk 13 at the contact zone inside the innermost recording track 15. The microactuator 35 keeps taking the first attitude. The elastic section 33 of the elastic suspension 24 is allowed to deform by a minimum quantity of deformation smaller than the first quantity. A predetermined resilience RF2 smaller than the resilience RF1 is stored in the elastic section 33. The elastic section 33 generates the urging force based on the resilience RF2. The intensity of the urging force is set smaller than the urging force of a predetermined intensity.

In this manner, the flying head slider 25 is urged against the surface of the magnetic recording disk 13 with the urging force of a relatively smaller intensity. Since the urging force is set relatively smaller, adsorption is suppressed to the utmost between the flying head slider 25 and the magnetic recording disk 13. The magnetic recording disk 13 is allowed to normally start rotating irrespective of reduction in the driving torque of the spindle motor 14. In general, a lubricating agent or oil spreading over the surface of the magnetic recording disk 13 tends to generate an adsorption or meniscus effect between the flying head slider 25 and the magnetic recording disk 13. The meniscus effect hinders the magnetic recording disk 13 from starting rotating.

Now, when an impact is applied to the HDD 11, for example, the acceleration sensor 31 detects the acceleration of the impact. The output from the acceleration sensor 31 is supplied to the controller circuit 39. The controller circuit 39 then generates control signals for the changing mechanism 26 in response to the supply of the output from the acceleration sensor 31. Voltage is applied to the respective piezoelectric elements 36, 36 based on the control signals. The microactuator 35 thus takes the second attitude. When the second attitude is established in this manner, the quantity of deformation increases in the elastic section 33 of the elastic suspension 24, as apparent from FIG. 7. The elastic section 33 of the elastic suspension 24 is allowed to deform by a second quantity of deformation larger than the first quantity. A predetermined resilience RF3 larger than the resilience RF1 is stored in the elastic section 33.

Figure 7:
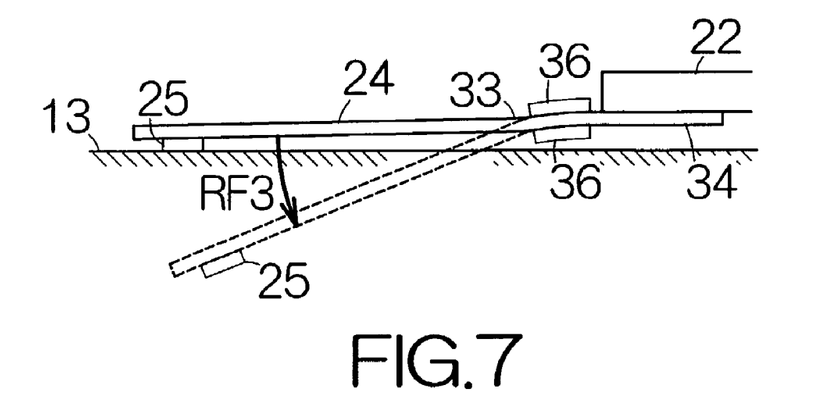
FIG. 7 is a schematic view illustrating the status of the head suspension assembly when an impact has been detected.

The intensity of the urging force gets enhanced in the elastic suspension 24 in this manner. The flying head slider 25 is thus urged against the surface of the magnetic recording disk 13 with the urging force of a larger intensity. Even when an impact is applied to the HDD 11, the flying head slider 25 is reliably prevented from jumping up from the surface of the magnetic recording disk 13. Since the flying head slider 25 is allowed to keep contacting the magnetic recording disk 13, a collision is surely avoided between the flying head slider 25 and the magnetic recording disk 13.

Figure 8:
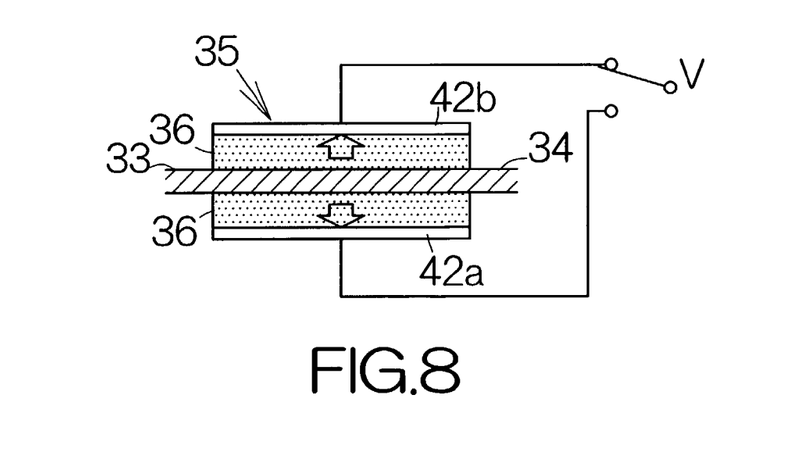
FIG. 8 is an enlarged vertical sectional view, corresponding to FIG. 3, of the microactuator according to a modification.

In this case, the polarization may be established in the direction from the electrically-conducive plate material to the individual electrode plates 42a, 42b in the aforementioned microactuator 35, as shown in FIG. 8. The controller circuit 39 supplies voltage signals to the piezoelectric element 36 on the front side from the electrode plate 42b when operating to establish the first attitude. Likewise, the controller circuit 39 supplies voltage signals to the piezoelectric element 36 on the back side from the electrode plate 42a when operating to establish the second attitude.

Figure 9:
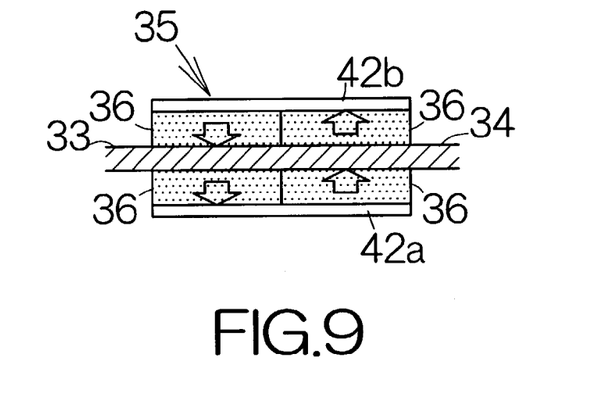
FIG. 9 is an enlarged vertical sectional view, corresponding to FIG. 3, of the microactuator according to another modification.
Figure 10:
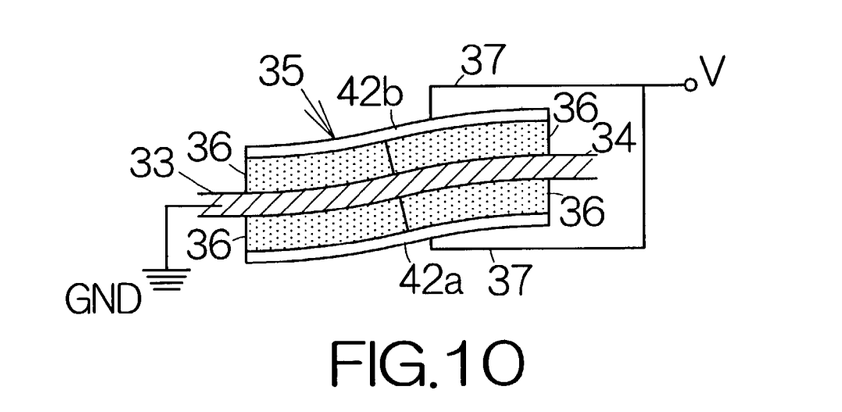
FIG. 10 is an enlarged vertical sectional view, corresponding to FIG. 9, of the microactuator taking the second attitude.

Otherwise, four of the piezoelectric elements 36 may be employed in total on the front and back sides of the plate material in the aforementioned microactuator 35, as shown in FIG. 9. The polarization is established in the piezoelectric elements 36 near the elastic section 33 in the direction from the electrode plate 42b to the electrode plate 42a, while the polarization is established in the piezoelectric element 36 near the fixation plate 34 in the direction from the electrode plate 42a to the electrode plate 42b. When voltage is applied to the individual piezoelectric elements 36 from the electrode plates 42a, 42b, as shown in FIG. 10, the elastic suspension 24 is allowed to approach the magnetic recording disk 13 without suffering from any change in the attitude.

Figure 11:
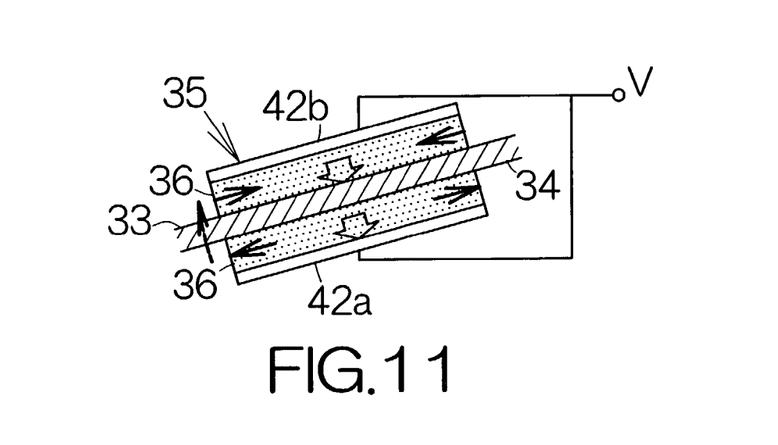
FIG. 11 is an enlarged vertical sectional view, corresponding to FIG. 3, of the microactuator according to a further modification.

Furthermore, the polarization may be established in the piezoelectric elements 36 in the opposite direction, namely, in the direction from the electrode plate 42b to the electrode plate 42a in the aforementioned microactuator 35, as shown in FIG. 11. When voltage is applied to the individual piezoelectric elements 36 from the electrode plates 42a, 42b in this type of the microactuator 35, the piezoelectric element 36 on the front side shrinks along the surface of the plate material while the piezoelectric element 36 on the back side elongates along the surface of the plate material. The microactuator 35 takes the predetermined second attitude when the piezoelectric elements 36 keeps the original shapes. When voltage is applied to the piezoelectric elements 36, the microactuator is allowed to take the predetermined first attitude. When the first attitude of the microactuator 35 is established, the elastic section 33 gets distanced from the magnetic recording disk 13.

In this case, the controller circuit 39 should be designed to supply control or voltage signals to the piezoelectric elements 36 during the rotation of the magnetic recording disk 13. The piezoelectric element 36 on the front side shrinks, while the piezoelectric element 36 on the back side elongates. The microactuator 35 takes the first attitude in this manner. The flying head slider 25 is allowed to fly above the surface of the magnetic recording disk 13 by a predetermined flying height H. The elastic section 33 of the elastic suspension 24 deforms by a relatively larger first quantity of deformation, as shown in FIG. 5, for example. A predetermined resilience RF1 is stored in the elastic section 33. The elastic section 33 generates the urging force of a predetermined intensity based on the resilience RF1. The generated urging force is balanced with the lift of the flying head slider 25.

When the magnetic recording disk 13 stands still, the microactuator 35 keeps taking the first attitude in the same manner as described above. The elastic section 33 of the elastic suspension 24 is allowed to deform by a minimum quantity of deformation smaller than the first quantity, as shown in FIG. 6, for example. A predetermined resilience RF2 smaller than the resilience RF1 is stored in the elastic section 33. The elastic section 33 generates the urging force based on the resilience RF2. This urging force is set smaller than the urging force of the predetermined intensity.

Now, when an impact is applied to the HDD 11, for example, the acceleration sensor 31 detects the acceleration of the impact. The controller circuit 39 then controls the operation of the changing mechanism 26 in response to the output from the acceleration sensor 31. The supply of voltage is terminated for the individual piezoelectric elements 36, 36. The microactuator 35 thus takes the second attitude. When the second attitude is established in this manner, the quantity of deformation increases in the elastic section 33 of the elastic suspension 24, as shown in FIG. 7, in the same manner as described above. The elastic section 33 of the elastic suspension 24 is allowed to deform by a second quantity of deformation larger than the first quantity. A predetermined resilience RF3 larger than the resilience RF1 is stored in the elastic section 33.

The intensity of the urging force gets enhanced in the elastic suspension 24 in this manner. The flying head slider 25 is thus urged against the surface of the magnetic recording disk 13 with the urging force of a larger intensity. Even when an impact is applied to the HDD 11, the flying head slider 25 is reliably prevented from jumping up from the surface of the magnetic recording disk 13. Since the flying head slider 25 is allowed to keep contacting the magnetic recording disk 13, a collision is surely avoided between the flying head slider 25 and the magnetic recording disk 13.

The supply of voltage to the microactuator 35 can be terminated in the HDD 11 not only in case where an impact is detected in the acceleration sensor 31 as described above but also in case where the magnetic recording disk 13 simply stands still. According to this control, the urging force of the elastic suspension 24 can be increased when the magnetic recording disk 13 stands still as compared with the situation where a relative movement is established between the magnetic recording disk 13 and the flying head slider 25 due to the rotation of the magnetic recording disk 13. The flying head slider 25 is allowed to receive the urging force of a larger intensity all times when the flying head slider 25 is intended to contact the surface of the magnetic recording disk 13.

In this case, even when an impact acts on the HDD 11 with the magnetic recording disk 13 standing still, the flying head slider 25 is reliably prevented from jumping up from the surface of the magnetic recording disk 13 even without utilization of the output from the acceleration sensor 31. The acceleration sensor 31 may be omitted from the HDD 11. The supply of electric power can be terminated for the HDD 11 when the magnetic recording disk 13 stands still. The consumption of electric power can be reduced in the HDD 11. It is preferable to establish the first attitude of the microactuator 35 when the magnetic recording disk 13 is intended to start rotating as well as when the magnetic recording disk 13 is intended to stop rotating.

Figure 12:
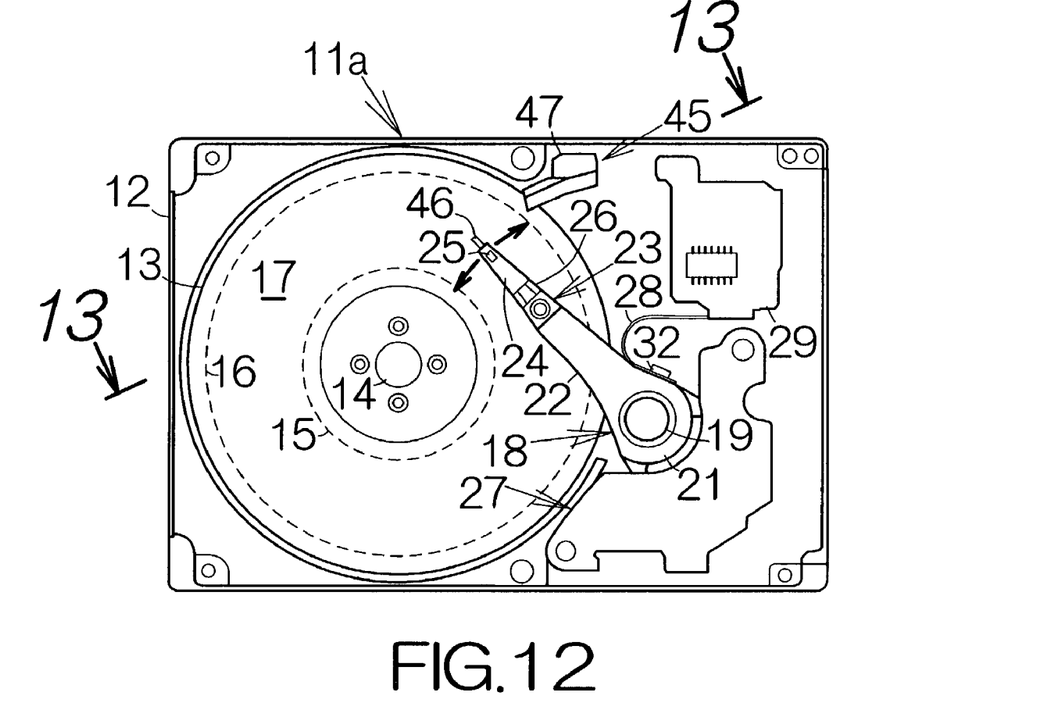
FIG. 12 is a plan view schematically illustrating the structure of a hard disk drive (HDD) as an example of a magnetic recording medium drive according to a second embodiment of the present invention.

FIG. 12 illustrates the inner structure of a hard disk drive (HDD) 11a as a specific example of a magnetic recording medium drive or storage device according to a second embodiment of the present invention. A so-called load/unload mechanism 45 is incorporated in the HDD 11a. It should be noted that like reference numerals are attached to the structure or components identical or equivalent to those of the aforementioned first embodiment.

Specifically, the load/unload mechanism 45 includes a load bar 46 extending forward from the front end of the elastic suspension 24. The load bar 46 is allowed to move in the radial direction of the magnetic recording disk 13 in response to the swinging movement of the actuator arm 22. A ramp member 47 is disposed outside the magnetic recording disk 13 on the path of the movement of the load bar 46. When the actuator arm 22 is positioned at an inoperative position outside the magnetic recording disk 13, the ramp member 47 receives the load bar 46.

Figure 13:
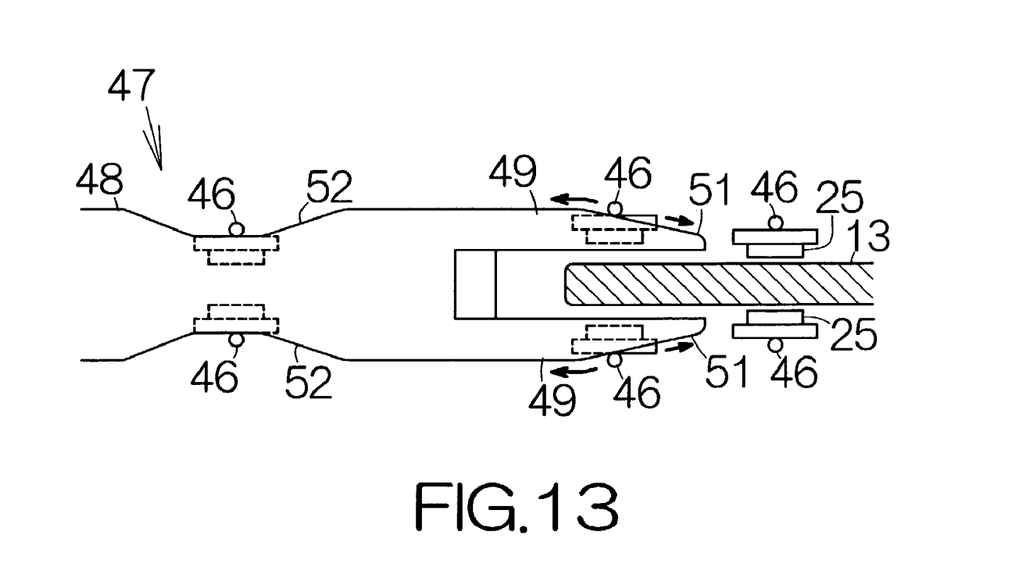
FIG. 13 is an enlarged vertical sectional view, taken along the line 13—13 in FIG. 12, of a ramp member.

As shown in FIG. 13, the ramp member 47 includes an arm member 48 horizontally extending from an attachment base, not shown, screwed to the bottom plate of the primary enclosure 12, for example. The arm member 48 is designed to extend toward the rotation axis of the magnetic recording disk 13. A pair of ramps 49 are integrally formed on the arm member 47. The ramps 49 are designed to face the marginal zones outside the outermost recording tracks 16 on the front and back surfaces of the magnetic recording disk 13. A slope 51 is defined on the individual ramp 49. The slope 51 is designed to get remote from the surface of the magnetic recording disk 13 at the radially outer location of the magnetic recording disk 13.

Now, assume that the rotation of the magnetic recording disk 13 is terminated. When read/write operations have been completed, the driving power source 27 drives the actuator arm 22 in a normal direction toward the inoperative position. When the flying head slider 25 gets opposed to the marginal or landing zone outside the outermost recording track 16, the load bar 46 is allowed to contact the slope 51 of the ramp 49. A further swinging movement of the actuator arm 22 allows the load bar 46 to climb up the slope 51. As the load bar 46 gets higher along the slope 51, the flying head slider 25 gets remote from the surface of the magnetic recording disk 13. The load bar 46 is received on the ramp member 47 in this manner. When the actuator arm 22 has reached the inoperative position, the load bar 46 is received in a depression 52. The magnetic recording disk 13 stops rotating. Since the load bar 46 is reliably supported on the ramp member 47, the flying head slider 25 is prevented from colliding or contacting against the magnetic recording disk 13 even without any airflow acting on the flying head slider 25.

When the HDD 11a receives instructions to read or write magnetic information from the host 41, the magnetic recording disk 13 starts rotating. The driving power source 27 drives the actuator arm 22 in the reverse direction opposite to the aforementioned normal direction after the rotation of the magnetic recording disk 13 enters the steady condition. The load bar 46 is allowed to move out of the depression 52 toward the slope 51. A further swinging movement of the actuator arm 22 causes the load bar 46 to move down the slope 51.

During the downward movement of the load bar 46, the flying head slider 25 gets opposed to the surface of the magnetic recording disk 13. Airflow generated along the surface of the magnetic recording disk 13 induces a lift on the flying head slider 25. A further swinging movement of the actuator arm 22 allows the load bar 46 to take off from the slope 51 or ramp member 47. Since the magnetic recording disk 13 rotates in the steady condition, the flying head slider 25 can fly above the surface of the magnetic recording disk 13 without a support from the ramp member 47.

The microactuator 35 takes the first attitude when the load bar 46 takes off the ramp member 47 in the HDD 11a. When the first attitude of the microactuator 35 has been established, the elastic section 33 of the elastic suspension 24 deforms by a relatively smaller first quantity of deformation. A predetermined resilience RF1 corresponding to the first quantity is stored in the elastic section 33. The elastic section 33 generates the urging force of a predetermined intensity based on the resilience RF1. The generated urging force of the predetermined intensity is balanced with the lift of the flying head slider 25.

The microactuator 35 keeps taking the second attitude during the rotation of the magnetic recording disk 13. The elastic section 33 of the elastic suspension 24 is allowed to deform by a second quantity of deformation larger than the first quantity. A predetermined resilience RF3 larger than the resilience RF1 is stored in the elastic section 33. Here, the elastic suspension 24 allows the urging force of the maximum intensity to act on the flying head slider 25. Since the urging force corresponding to the second quantity is balanced with the lift of the flying head slider 25, the flying head slider 25 is allowed to keep flying by a predetermined flying height H.

When the flying head slider 25 takes off from the ramp member 47, the aforementioned structure induces a reduction in the urging force of the elastic suspension 24. The flying head slider 25 can enjoy the urging force of a reduced intensity in dropping. Accordingly, the flying head slider 25 can be prevented to the utmost from colliding against the magnetic recording disk 13. If the flying head slider 25 drops with an enough intensity, the flying head slider 25 is forced to collide against the surface of the magnetic recording disk 13. The collision in this manner is supposed to generate damages on the flying head slider 25 and/or the magnetic recording disk 13.

In addition, the microactuator 35 may take the first attitude when the load bar 46 is maintained on the ramp member 37 in the HDD 11a. In this case, the deformation of the elastic section 33 can be suppressed to the utmost when the load bar 46 is received on the ramp member 47. Only the minimum resilience can be stored in the elastic suspension 24. The load to the elastic suspension 24 can be suppressed to the utmost when the magnetic recording disk 13 stands still.

The operation of the changing mechanism 26 may be controlled based on the read signals output from the read element on the flying head slider 25 in the HDD 11, 11a. Specifically, the controller circuit 39 may be designed to supply to the microactuator 35 the control signals for enhancing the intensity of the urging force of the elastic suspension 24 in case where the voltage level of the read signals from the signal processing circuit cannot reach a predetermined threshold level. A reduced flying height of the flying head slider 25 based on the increased urging force serves to enhance the voltage or intensity of the read signals. On the other hand, the controller circuit 39 should supply to the microactuator 35 the control signals for reducing the urging force of the elastic suspension 24 in case where the voltage level of the read signals from the signal processing circuit exceeds the predetermined threshold level. An increased flying height of the flying head slider 25 based on the reduced urging force serves to reduce the voltage or intensity of the read signals. According to the adjustment of the voltage or intensity of the read signals based on the operation of the changing mechanism 26 in this manner, a static dispersion of a predetermined range may be permitted in the flying height of the flying head slider 25. Requirement to the accuracy can be relieved in assembling the head suspension assembly 23 to the actuator arm 22. The yield of the HDD 11, 11a can be improved. In this case, signal patterns, specific to the control of the changing mechanism 26 may be established on the magnetic recording disk 13 at a servo pattern area in the data zone 17.

What is claimed is:

1. A recording medium drive comprising:
   an enclosure;
   a recording medium incorporated within the enclosure;
   a head slider incorporated within the enclosure;
   an elastic urging member designed to establish an urging force of a predetermined intensity on the head slider toward the recording medium when the head slider flies above the recording medium at a predetermined flying height;
   a changing mechanism designed to change the urging force of the elastic urging member;
   an impact sensor attached to the enclosure and designed to detect acceleration of the enclosure; and
   a controller circuit designed to control the changing mechanism in response to an output of the impact sensor.

2. The recording medium drive according to claim 1, wherein said changing mechanism comprises a microactuator designed to take first and second attitudes, said first attitude causing the elastic urging member to deform by a first quantity so as to establish the urging force of the predetermined intensity based on a resilience, said second attitude causing the elastic urging member to deform by a second quantity larger than the first quantity so as to increase the urging force.

3. The recording medium drive according to claim 2, wherein said microactuator includes a piezoelectric element attached to the elastic urging member and designed to elongate and shrink depending on supply of an electric power.

4. The recording medium drive according to claim 3, wherein said piezoelectric element is designed to take the second attitude when the piezoelectric element receives the electric power.

5. The recording medium drive according to claim 3, wherein said piezoelectric element is designed to take the first attitude when the piezoelectric element receives the electric power.

6. A recording medium drive comprising:
   an enclosure;
   a recording medium incorporated within the enclosure;
   a head slider incorporated within the enclosure;
   an elastic urging member designed to establish an urging force of a predetermined intensity on the head slider toward the recording medium when the head slider flies above the recording medium at a predetermined flying height;
   a changing mechanism designed to change the urging force of the elastic urging member; and
   a controller circuit designed to control the changing mechanism to increase the urging force of the elastic urging member when the recording medium stands still rather than during movement of the recording medium.

7. The recording medium drive according to claim 6, wherein said changing mechanism comprises a microactuator designed to take first and second attitudes, said first attitude causing the elastic urging member to deform by a first quantity so as to establish the urging force of the predetermined intensity based on a resilience, said second attitude causing the elastic urging member to deform by a second quantity larger than the first quantity so as to increase the urging force.

8. The recording medium drive according to claim 7, wherein said microactuator includes a piezoelectric element attached to the elastic urging member and designed to elongate and shrink depending on supply of an electric power.

9. The recording medium drive according to claim 8, wherein said piezoelectric element is designed to take the second attitude when the piezoelectric element receives the electric power.

10. The recording medium drive according to claim 8, wherein said piezoelectric element is designed to take the first attitude when the piezoelectric element receives the electric power.

11. A recording medium drive comprising:
    an enclosure;
    a recording medium incorporated within the enclosure;
    a head slider incorporated within the enclosure;

an elastic urging member designed to establish an urging force of a predetermined intensity on the head slider toward the recording medium when the head slider flies above the recording medium at a predetermined flying height;

a microactuator designed to take first and second attitudes, the first attitude causing the elastic urging member to deform by a first quantity so as to establish the urging force of the predetermined intensity based on a resilience, the second attitude causing the elastic urging member to deform by a second quantity larger than the first quantity so as to increase the urging force;

a ramp member designed to receive the urging force of the elastic urging member, when the recording medium stands still, so as to hold the head slider at an inoperative position spaced from the recording medium; and a controller circuit designed to allow the microactuator to take the first attitude during engagement of the elastic urging member on the ramp member and release of the elastic urging member from the ramp member, said controller circuit allowing the microactuator to take the second attitude during flight of the head slider above a data zone of the recording medium.

12. The recording medium drive according to claim 11, wherein said microactuator includes a piezoelectric element attached to the elastic urging member and designed to elongate and shrink depending on supply of an electric power.

13. The recording medium drive according to claim 12, wherein said piezoelectric element is designed to take the second attitude when the piezoelectric element receives the electric power.

14. The recording medium drive according to claim 12, wherein said piezoelectric element is designed to take the first attitude when the piezoelectric element receives the electric power.

15. A method of controlling, comprising urging a head slider toward a recording medium in a recording medium drive when the recording medium stands still, with an urging force larger than that during movement of the recording medium.

16. A method of controlling, comprising:

urging a head slider toward a recording medium in a recording medium drive with an urging force of a predetermined intensity; and increasing the urging force when acceleration of the recording medium drive is detected based on an output from an impact sensor.

17. A method of controlling, comprising:

urging a head slider toward a recording medium in a recording medium drive with an urging force of a predetermined intensity when the recording medium stands still; and decreasing the urging force when the head slider moves relative to the recording medium rather than when the head slider flies above the recording medium.

18. A method of controlling, comprising:

applying an urging force of a predetermined intensity to a head slider when the head slider flies above a data zone of a recording medium so that the head slider flies above the data zone by a predetermined flying height in a recording medium drive; and decreasing the urging force during engagement of a member supporting a head slider on a ramp member of a load/unload mechanism and during release of the member from the ramp member.

19. The recording medium drive according to claim 11, wherein the microactuator includes a piezoelectric element attached to the elastic urging member, the microactuator takes the first attitude when the piezoelectric element receives electric power, and the microactuator takes the second attitude based on an original shape of the piezoelectric element without receiving of the electric power.

* * * * *